(12) United States Patent
Fulmer et al.

(10) Patent No.: US 8,511,717 B2
(45) Date of Patent: Aug. 20, 2013

(54) POKA-YOKE FOR A SET OF HYDRAULIC FITTINGS

(75) Inventors: Bryan Fulmer, Pewaukee, WI (US);
Brian Curtis, Waukesha, WI (US);
Christopher R. Poquette, Neenah, WI (US); William Boppre, West Bend, WI (US); Steve Twining, Richfield, WI (US); Samuel D. McCarley, Greendale, WI (US); Dean Lax, Brownsville, WI (US)

(73) Assignee: Harley-Davidson Motor Company Group, LLC, Milwaukee, WI (US)

( * ) Notice: Subject to any disclaimer, the term of this patent is extended or adjusted under 35 U.S.C. 154(b) by 238 days.

(21) Appl. No.: 13/173,135

(22) Filed: Jun. 30, 2011

(65) Prior Publication Data
US 2013/0001942 A1    Jan. 3, 2013

(51) Int. Cl.
*F16L 41/00* (2006.01)
(52) U.S. Cl.
USPC ........................................ 285/191; 285/120.1
(58) Field of Classification Search
USPC .................... 285/120.1, 124.5, 191, 185, 273
See application file for complete search history.

(56) References Cited

U.S. PATENT DOCUMENTS

| | | | | |
|---|---|---|---|---|
| 2,307,328 A * | 1/1943 | Martin | ........................ | 285/190 |
| 3,570,534 A | 3/1971 | Beavers | | |
| 4,874,008 A | 10/1989 | Lawson | | |
| 5,228,725 A * | 7/1993 | Aoyagi et al. | ............. | 285/141.1 |
| 5,516,156 A | 5/1996 | Williamson | | |
| 5,533,764 A | 7/1996 | Williamson | | |
| 6,312,020 B1 | 11/2001 | Ketcham et al. | | |
| 6,527,302 B1 | 3/2003 | Gault et al. | | |
| 6,619,700 B2 | 9/2003 | Kacines | | |
| 6,685,232 B2 | 2/2004 | Sampson | | |
| 6,688,440 B2 * | 2/2004 | Matsushita et al. | ........... | 188/344 |
| 6,886,866 B1 | 5/2005 | Hool | | |
| 7,083,202 B2 * | 8/2006 | Eberle et al. | ............... | 285/124.4 |
| 7,226,088 B2 | 6/2007 | Skiba et al. | | |
| 2004/0160056 A1 | 8/2004 | Albrecht et al. | | |
| 2008/0277920 A1 | 11/2008 | Randle | | |
| 2009/0241631 A1 | 10/2009 | Carper et al. | | |
| 2010/0066076 A1 | 3/2010 | Lundgren | | |

FOREIGN PATENT DOCUMENTS

| | | |
|---|---|---|
| EP | 646748 A1 | 4/1995 |
| EP | 2083204 A1 | 7/2009 |
| JP | 2004316692 A | 11/2004 |
| JP | 2004353788 A * | 12/2004 |
| JP | 2011006033 A * | 1/2011 |
| WO | 9727094 A1 | 7/1997 |
| WO | 2009111081 A1 | 9/2009 |

* cited by examiner

*Primary Examiner* — Aaron Dunwoody
(74) *Attorney, Agent, or Firm* — Michael Best & Friedrich LLP

(57) ABSTRACT

A hydraulic manifold assembly having a block including a plurality of fluid ports provided on a common surface of the block, and a set of hydraulic fittings. Each fitting is assigned to a prescribed one of the ports. Each fitting includes a hollow bolt insertable into the prescribed fluid port, and a banjo block having a first aperture for receiving the hollow bolt and a second aperture intersecting the first aperture. The second aperture provides an external fluid port for fluidly coupling a remote device. The plurality of banjo blocks includes at least one adjacent pair of banjo blocks that are unique from each other and have exterior shapes complementary to each other to control the relative orientation therebetween when coupled to the prescribed fluid ports. The exterior shapes of the adjacent banjo blocks cooperate to prevent misassembly.

23 Claims, 9 Drawing Sheets

POKA-YOKE FOR A SET OF HYDRAULIC FITTINGS

BACKGROUND

The present invention relates to means for connecting brake lines to an anti-lock braking unit, or "hydraulic unit", of an anti-lock braking system. The hydraulic unit includes at least one pump driven by a motor, inlet and outlet valves for controlling the flow of hydraulic fluid to and from the wheel cylinders of the brakes, and at least one accumulator for storing hydraulic fluid relieved from the wheel cylinder under anti-lock action (when the ABS system intervenes to relieve braking force by relieving hydraulic fluid from one or more wheel cylinders back to the hydraulic unit). A controller is provided to monitor vehicle conditions, such as relative wheel speeds, and to control the state of the valves in the hydraulic unit and the operation of the pump. The pump returns hydraulic fluid from the hydraulic unit back to the master cylinder, which is coupled with a user-operated actuator (e.g., pedal or hand lever) to deliver hydraulic fluid to enact braking.

The hydraulic connections between the ABS hydraulic unit and both the master cylinder and the wheel cylinders of the vehicle brakes are typically made by coupling brake lines to ports on the ABS hydraulic unit with so-called "banjo" fittings. The term banjo fitting refers to the combination of a hollow bolt and a banjo block used together as described below. Near the head, the bolt includes a transverse aperture connecting with the hollow portion. The banjo block includes an opening to receive the hollow bolt, the opening having an internal chamber for establishing fluid communication with the transverse aperture in the bolt. A transverse aperture in the banjo block is provided in fluid communication with the chamber and extends away from the chamber for connection with a brake line. Most often, the outside of the banjo block is round at the bolt-receiving aperture, and the transverse aperture is arranged at a 90 degree angle with respect to the axis of the bolt-receiving aperture (thus, the resemblance to a banjo musical instrument). However, banjo blocks need not have this exact shape or orientation. Examples of the standard banjo fitting and more recent adaptations are described and illustrated in U.S. Pat. No. 7,226,088, the entire contents of which are hereby incorporated by reference.

The specific internal arrangement of valves, pump(s), and accumulator(s) within the hydraulic unit of the ABS system demands that each external port of the hydraulic unit be coupled with the brake line leading to a specific location to ensure proper operation of the anti-lock braking system. In other words, each remote component of the braking system that is fluidly coupled to the hydraulic unit has its own predetermined port on the hydraulic unit that must be utilized.

Known methods of assisting proper assembly of the brake lines to the corresponding ports on the ABS hydraulic unit include the use of fingers on round banjo blocks, controlling the routing of each brake line to a particular location, and also the use of labels or tags on the brake lines. An example of a prior art assembly aid is shown in FIG. 9. The ABS hydraulic unit 920 includes a block 924, and four brake lines 932A-D are coupled to four ports on a surface 948 of the block 924 via four banjo fittings 936A-D. Each banjo fitting 936A-D includes a hollow bolt 937A-D and a banjo block 938A-D. Two of the brake lines 932A, 932B are routed to approach the surface 948 from one side, and the other two brake lines 932C, 932D are routed to approach the surface 948 from the opposite side. Furthermore, two of the banjo blocks 938A, 938D are provided with projections in the form of bent fingers 941 that are configured to be received within positioning recesses or apertures 943 in the surface 948 of the block 924 when the banjo fittings 936A-D are properly assembled with the block 924. The fingers 941 on the banjo blocks 938A, 938D are provided to inhibit the likelihood of misassembling the set of banjo fittings 936A-D (i.e., the user can easily recognize which of the two brake lines 932A, 932B approaching from the first side should be coupled to which of the two ports on that side, and can easily recognize which of the two brake lines 932C, 932D approaching from the second side should be coupled to which of the two ports on that side). However, brake lines and fingers can be bent to different orientations, and labels can be ignored, damaged, or lost. Thus, the methods described above serve as useful aids, but provide no guarantee against improper final assembly.

U.S. Pat. No. 6,886,866 discloses a set of tube nuts of different lengths for connecting tubes to a hydraulic manifold. Tube nut stops provided on the manifold prevent misassembly of a short tube nut to the port where a long tube nut should be coupled. However, this approach requires the addition of tube nut stops to the hydraulic manifold, and it requires a large amount of free space be made available on the side of the manifold for the relatively large protrusion of the long tube nuts and tube nut stops. Furthermore, assembly of long tube nuts into the ports where short tube nuts are desired is passively discouraged (by its awkward appearance when assembled), but it is not actually prevented.

SUMMARY

In one aspect, the invention provides a hydraulic manifold assembly having a block including a plurality of fluid ports provided on a common surface of the block, and a set of hydraulic fittings. Each fitting of the set is assigned to a prescribed one of the plurality of fluid ports of the block. Each fitting of the set includes a hollow bolt insertable into the prescribed fluid port, and a banjo block having a first aperture for receiving the hollow bolt and a second aperture intersecting the first aperture. The second aperture provides an external fluid port for fluidly coupling a remote device to the prescribed one of the plurality of fluid ports of the block. The plurality of banjo blocks includes at least one adjacent pair of banjo blocks that are unique from each other and have exterior shapes that are complementary to each other to control the relative orientation therebetween when coupled to the prescribed fluid ports. The exterior shapes of the at least one adjacent pair of banjo blocks cooperate to interfere with each other to prevent the assembly of a first banjo block of the at least one adjacent pair with the prescribed fluid port of a second banjo block of the at least one adjacent pair when the second banjo block is coupled with the prescribed fluid port of the first banjo block.

In another aspect, the invention provides a hydraulic manifold assembly having a block including a plurality of fluid ports provided on a common surface of the block, and a set of hydraulic fittings. Each fitting of the set is assigned to a prescribed one of the plurality of fluid ports of the block. Each fitting of the set includes a hollow bolt insertable into the prescribed fluid port, and a banjo block having a first aperture for receiving the hollow bolt and a second aperture intersecting the first aperture. The second aperture provides an external fluid port for fluidly coupling a remote device to the prescribed one of the plurality of fluid ports of the block. Each one of the plurality of banjo blocks has an exterior shape that complements the exterior shape of at least one adjacent banjo block to allow the banjo block to lie side-by-side with the at least one adjacent banjo block against the common surface when the banjo block and the at least one adjacent banjo block are positioned in register with the prescribed fluid ports. The exterior shape of each one of the plurality of banjo blocks also interferes with the exterior shape of the at least one adjacent banjo block to prevent the banjo block from lying side-by-side with the at least one adjacent banjo block against the common surface when at least one of the banjo block and the at least one adjacent banjo block is positioned in register with a non-prescribed fluid port.

In yet another aspect, the invention provides a hydraulic manifold assembly having a block including a plurality of fluid ports provided on a common surface of the block, and a set of hydraulic fittings. Each fitting of the set is assigned to a prescribed one of the plurality of fluid ports of the block. Each fitting of the set includes a hollow bolt insertable into the prescribed fluid port, and a banjo block having a first aperture for receiving the hollow bolt and a second aperture intersecting the first aperture. The second aperture provides an external fluid port for fluidly coupling a remote device to the prescribed one of the plurality of fluid ports of the block. The plurality of banjo blocks have exterior shapes that fit together in only one prescribed manner when all of the banjo blocks are positioned in register with the plurality of fluid ports so that the only way to assemble the entire set of hydraulic fittings to the block is when all of the hydraulic fittings are paired with their prescribed fluid ports.

In yet another aspect, the invention provides a method of assembling a hydraulic manifold assembly. The hydraulic manifold assembly includes a block including a plurality of fluid ports provided on a common surface of the block, and a set of hydraulic fittings. Each fitting of the set is assigned to a prescribed one of the plurality of fluid ports of the block, and each fitting of the set includes a hollow bolt insertable into the corresponding fluid port, and a banjo block having a first aperture for receiving the hollow bolt and a second aperture intersecting the first aperture, the second aperture providing an external fluid port for fluidly coupling a remote device to the prescribed one of the plurality of fluid ports of the block. The method includes coupling at least one adjacent pair of unique banjo blocks of the plurality of banjo blocks to the prescribed fluid ports such that the exterior shapes of the adjacent pair are complementary to each other to control the relative orientation therebetween, wherein the exterior shapes would otherwise cooperate to interfere with each other to prevent the assembly of a first banjo block of the at least one adjacent pair with the prescribed fluid port of a second banjo block of the at least one adjacent pair when the second banjo block is coupled with the prescribed fluid port of the first banjo block.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
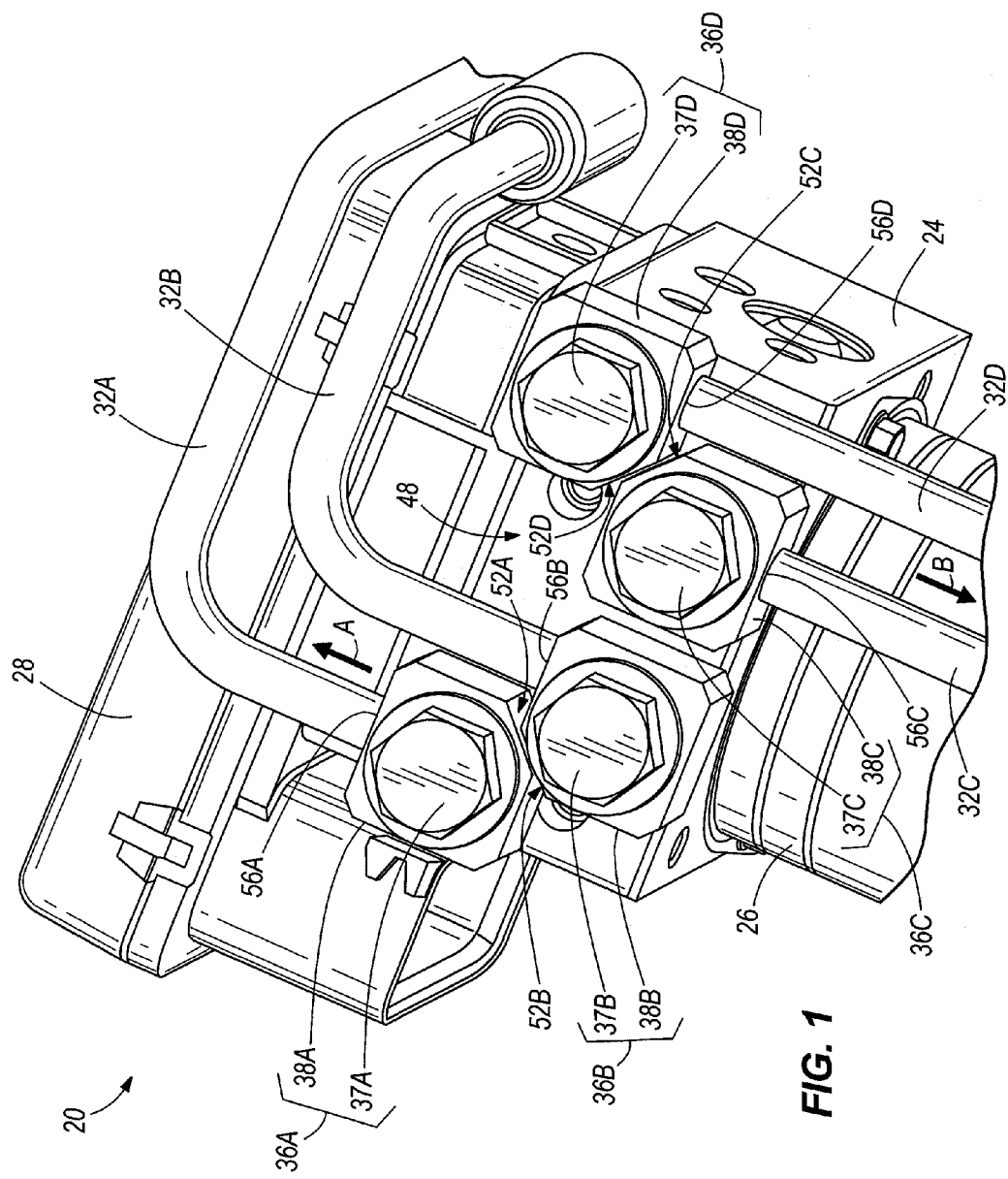
FIG. 1 is a perspective view of an ABS hydraulic unit, and a plurality of brake lines coupled to the ABS hydraulic unit via a set of banjo fittings of a first construction.

FIG. 1 illustrates a hydraulic unit 20 for an anti-lock braking system (ABS). The ABS hydraulic unit 20 includes a block 24, a motor 26, and an electronic control unit 28. Although not shown, the block 24 houses a pump (driven by the motor 26), valves, and an accumulator. The block 24 is configured to receive hydraulic fluid from an actuator (e.g., a foot pedal- or hand lever-actuated master cylinder), to deliver hydraulic fluid to one or more wheel cylinders of one or more vehicle brakes, and to perform an anti-locking function by which braking force is reduced by relieving hydraulic fluid from the wheel cylinder(s) as controlled by an electronic control unit 28. The control unit 28 may receive signals from wheel speed sensors, which are analyzed by the control unit 28, which then opens a valve within the block 24 if it determines that the braking force being applied by the driver has exceeded the traction limit. A plurality of brake lines 32A-D are coupled to the block 24 with a corresponding set of hydraulic fittings ("banjo" fittings) 36A-D, each banjo fitting 36A-D including a hollow bolt 37A-D and a banjo block 38A-D. The hollow bolts 37A-D extend through axial apertures or bores 40A-D (FIGS. 2 and 3) in the respective banjo blocks 38A-D to mechanically couple the banjo blocks 38A-D to the block 24 and establish fluid communication between the block 24 and the brake lines 32A-D through the banjo fittings 36A-D. In the illustrated construction, four brake lines 32A-D are shown, but two, three, or more than four brake lines may be provided in other constructions. Also, in the illustrated construction, the two brake lines 32A, 32B on one side of the block 24 extend from their corresponding banjo fittings 36A, 36B in a first direction (arrow A), and the two brake lines 32C, 32D on the other side of the block 24 extend from their corresponding banjo fittings 36C, 36D in a second direction (arrow B) that is opposite the first direction. But, other orientations of brake lines are optional as needed for a particular application.

It should be noted that all of the banjo fittings 36A-D are coupled to ports 44A-D (FIG. 3) on a common surface 48 of the block 24. Furthermore, when the bolts 37A-D of the fittings 36A-D are tightened to the block 24, all of the banjo blocks 38A-D are positioned adjacent the surface 48 and are co-planar with each other. As described in further detail below, each banjo block 38A-D cooperates with at least one unique adjacent banjo block 38A-D to ensure not only proper orientation relative to the other fittings 36A-D and the block 24, but also proper assembly with the correct ports 44A-D and correct orientation. For example, the two banjo blocks 38A, 38B on the left side of FIGS. 1 and 3 (right side of FIG. 2) are unique from each other and have cooperating complementary skewed sidewall surfaces 52A, 52B. The first banjo block 38A is formed generally as a corner-truncated rectangular prism, with the skewed sidewall surface 52A being provided by the corner truncation of the banjo block 38A. A transverse aperture or port 56A, which intersects the bolt-receiving bore 40A in the banjo block 38A and receives the brake line 32A, is oriented centrally (its axis intersects the axis of the bolt 37A) on a side of the banjo block 38A that is remote from the skewed sidewall surface 52A. The transverse port 56A faces in the direction of arrow A, which is the direction of extension of the brake line 32A from the fitting 36A. The second banjo block 38B is formed generally as a corner-truncated rectangular prism, with the skewed sidewall surface 52B being provided by the corner truncation of the banjo block 38B. A transverse aperture or port 56B, which intersects the bolt-receiving bore 40B in the banjo block 38B and receives the brake line 32B, is oriented off-center (its axis does not intersect the axis of the bolt 37B) on a side of the banjo block 38B that is adjacent the skewed sidewall surface 52B. The transverse port 56B faces in the direction of arrow A, which is the direction of extension of the brake line 32B from the fitting 36B. Although several unique aspects of the two adjacent banjo blocks 38A, 38B are noted above, it should be understood that any difference in exterior shape, size, and orientation of apertures in a banjo block may make it unique from another banjo block.

Figure 3:
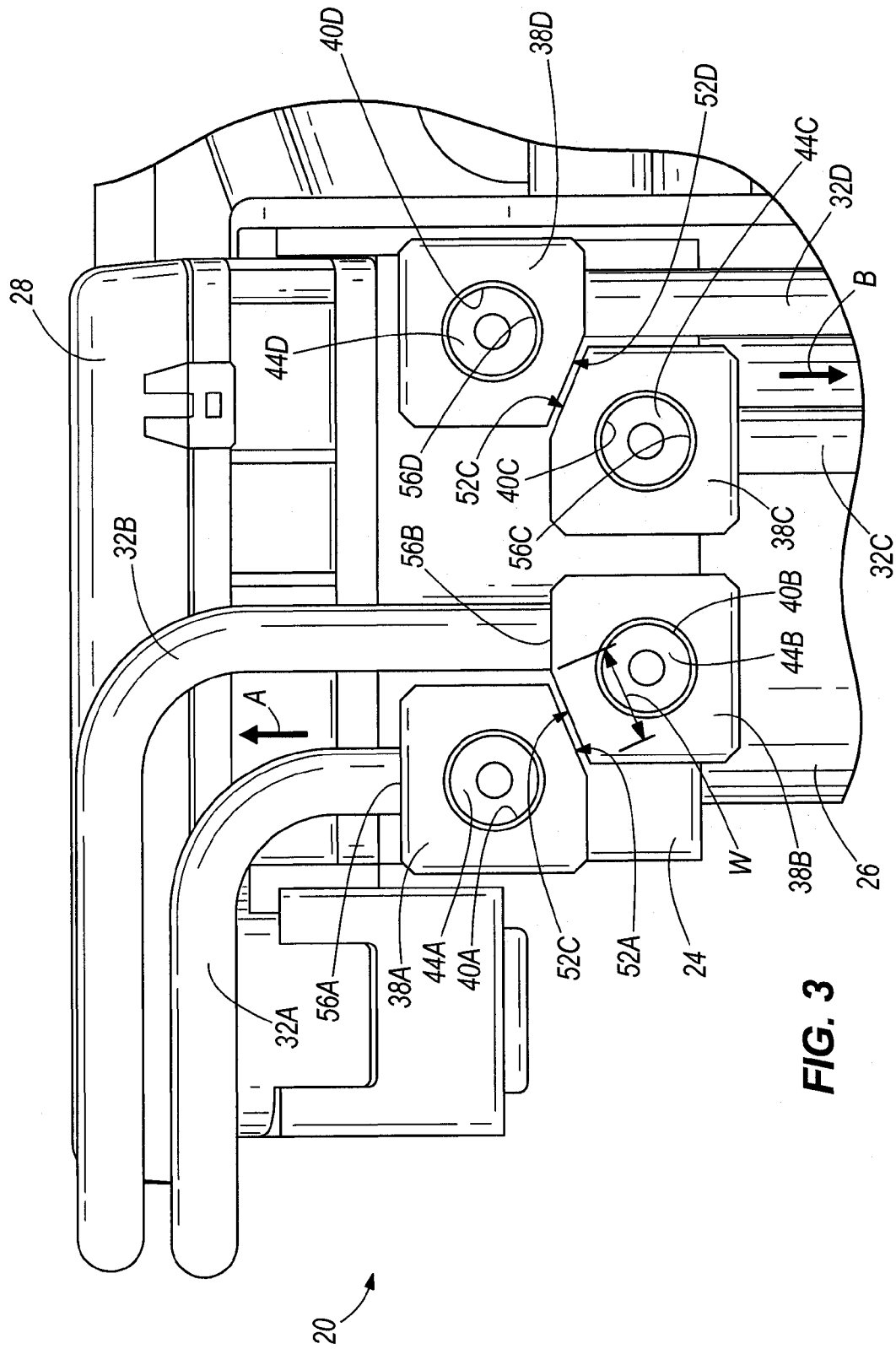
FIG. 3 is a top view of the ABS hydraulic unit of FIGS. 1-2.

The skewed sidewall surfaces 52A, 52B of the two adjacent banjo blocks 38A, 38B are designed to be in facing, parallel relationship and either in contact with each other or spaced only a nominal distance from each other (e.g., 10 percent or less of the overlapping width $W_1$ of the surfaces 52A, 52B viewed normal to the block surface 48 as shown in FIG. 3) when the banjo blocks 38A, 38B and their associated brake lines 32A, 32B are properly assembled with their respective ports 44A, 44B in the surface 48 of the block 24. The cooperating skewed sidewall surfaces 52A, 52B instruct the person assembling the unit 20 on how to connect the brake lines 32A, 32B to the ports 44A, 44B, and also inhibit or prevent rotation of either banjo block 38A, 38B with respect to the block 24. Furthermore, if the person assembling the unit 20 attempts to switch the fittings 36A, 36B (to couple the fitting 36A with the port 44B and couple the fitting 36B with the port 44A), assembly is physically prevented by the uniqueness of the two banjo blocks 38A, 38B. By providing each banjo block 38A, 38B with only one corner truncation, the two blocks 38A, 38B can only be put in register with the two ports 44A, 44B (i.e., aligning the bolt-receiving bores 40A, B with the ports 44A, 44B) in one relative orientation. Interference between the corners of the banjo blocks 38A, 38B will prevent the assembly of one of the fittings 36A, 36B to the wrong port 44A, 44B in the event that the other of the fittings 36A, 36B is coupled to the wrong port 44A, 44B. Furthermore, the placement of the brake line 32A coupled with the first banjo block 38A will prevent the second fitting 36B from being coupled to the first port 44A in the event that the first fitting 36A is erroneously coupled to the second port 44B. The second pair of fittings 36C, 36D that are used to couple the brake lines 32C, 32D with the ports 44C, 44D are provided with similar features to ensure proper assembly with the ports 44C, 44D. The skewed sidewall surfaces 52C, 52D and the orientation of the transverse ports 56C, 56D of the banjo blocks 38C, 38D prevent the assembly of both the fittings 36C, 36D with the block 24 unless they are coupled with their prescribed ports 44C, 44D. Thus, the banjo blocks 38A-D themselves cooperate with each other to provide an inherent poka-yoke (i.e., a mechanism that actively prevents an operator from making a mistake in a process) for the assembly of the banjo fittings 36A-D to the prescribed fluid ports 44A-D.

Figure 2:
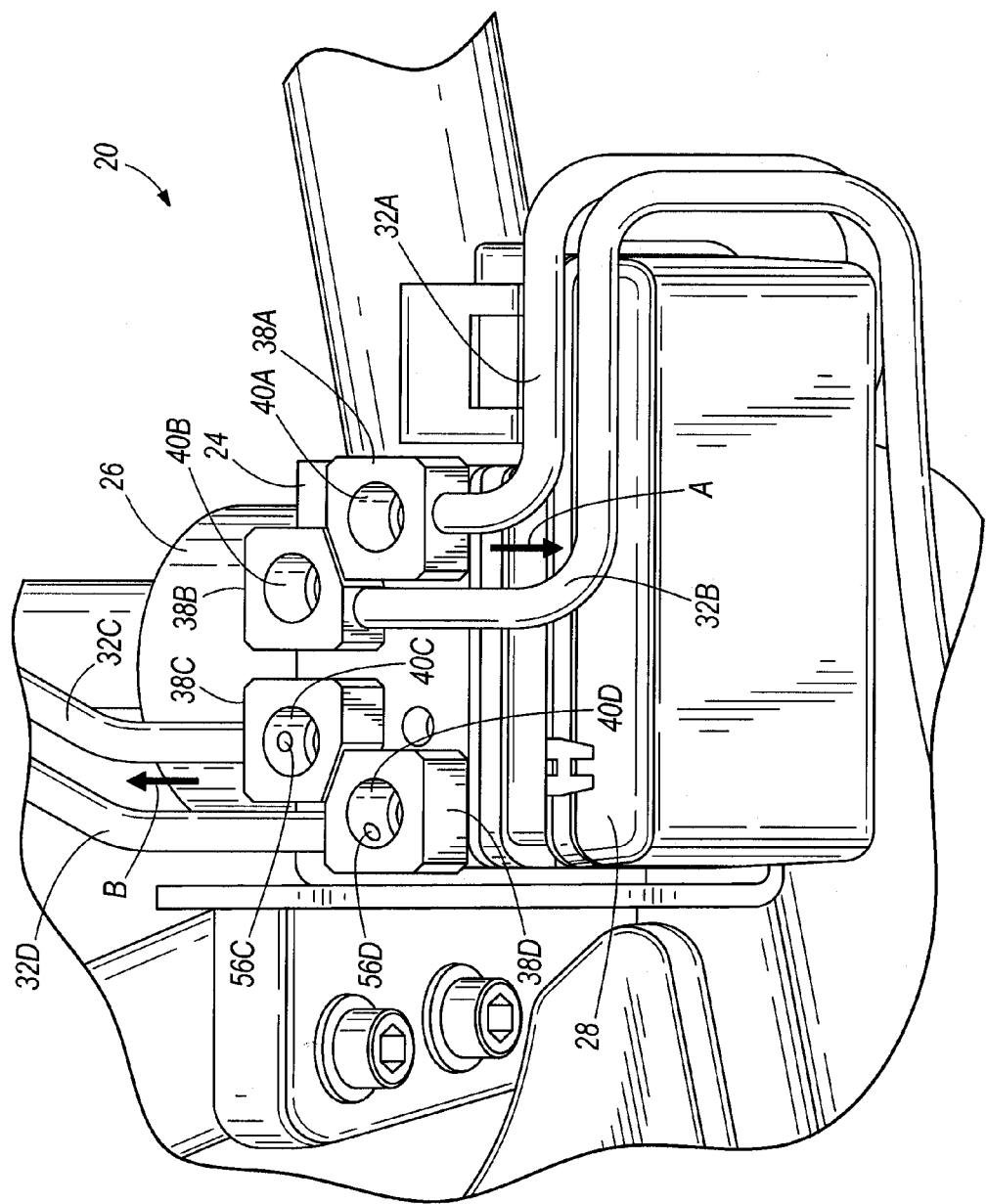
FIG. 2 is a second perspective view of the ABS hydraulic unit of FIG. 1.

It should be noted that various routings of the brake lines 32A-D may be provided, as desired by the manufacturer. For example, FIGS. 2 and 3 illustrate a variation of the routing of two of the brake lines 32A, 32B (beyond the initial extension in the direction of arrow A, which is common) from that shown in FIG. 1. Reasons for differing brake line routing may include providing adequate clearance for moving parts, providing access to serviceable items, limiting the required tubing and hydraulic fluid, etc. In addition to the two options illustrated in FIGS. 1-3, a myriad of other options are possible, including all brake lines extending from all banjo fittings in a single direction, and two sets of brake lines extending in directions 90 degrees from each other, among others. Furthermore, as described below, more than two pairs of cooperating banjo blocks may be provided on the block of an ABS unit, and one or more of the banjo blocks may cooperate with multiple adjacent banjo blocks. Also, in lieu of or in addition to complementary skewed sidewall surfaces, adjacent pairs of banjo blocks may cooperate with each other by complementary male-female portions, including corner-into-notch arrangements or protrusion-into-recess arrangements.

Figure 4:
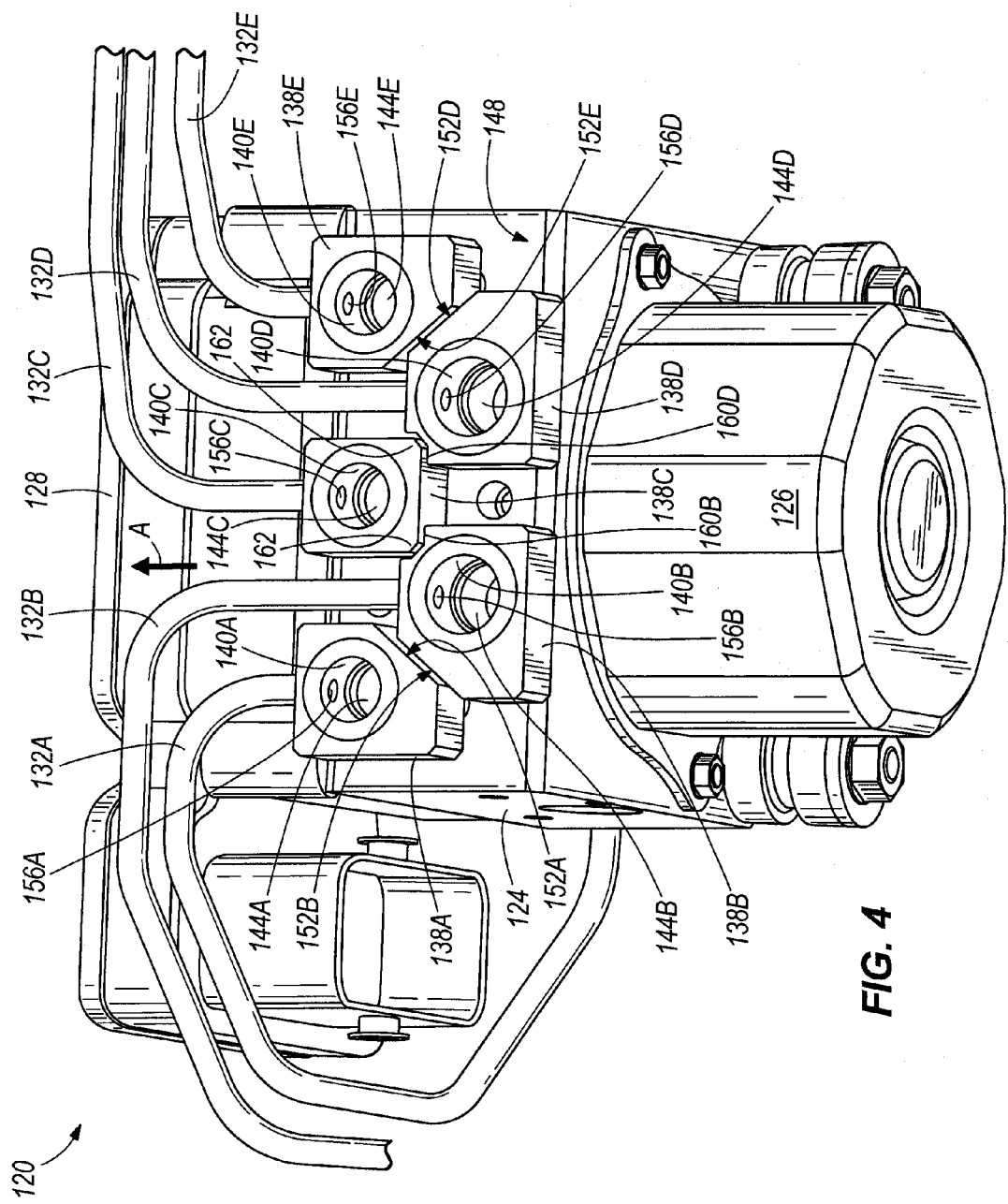
FIG. 4 is a perspective view of another ABS hydraulic unit, and a plurality of brake lines coupled to the ABS hydraulic unit via a set of banjo fittings of a second construction.
Figure 5:
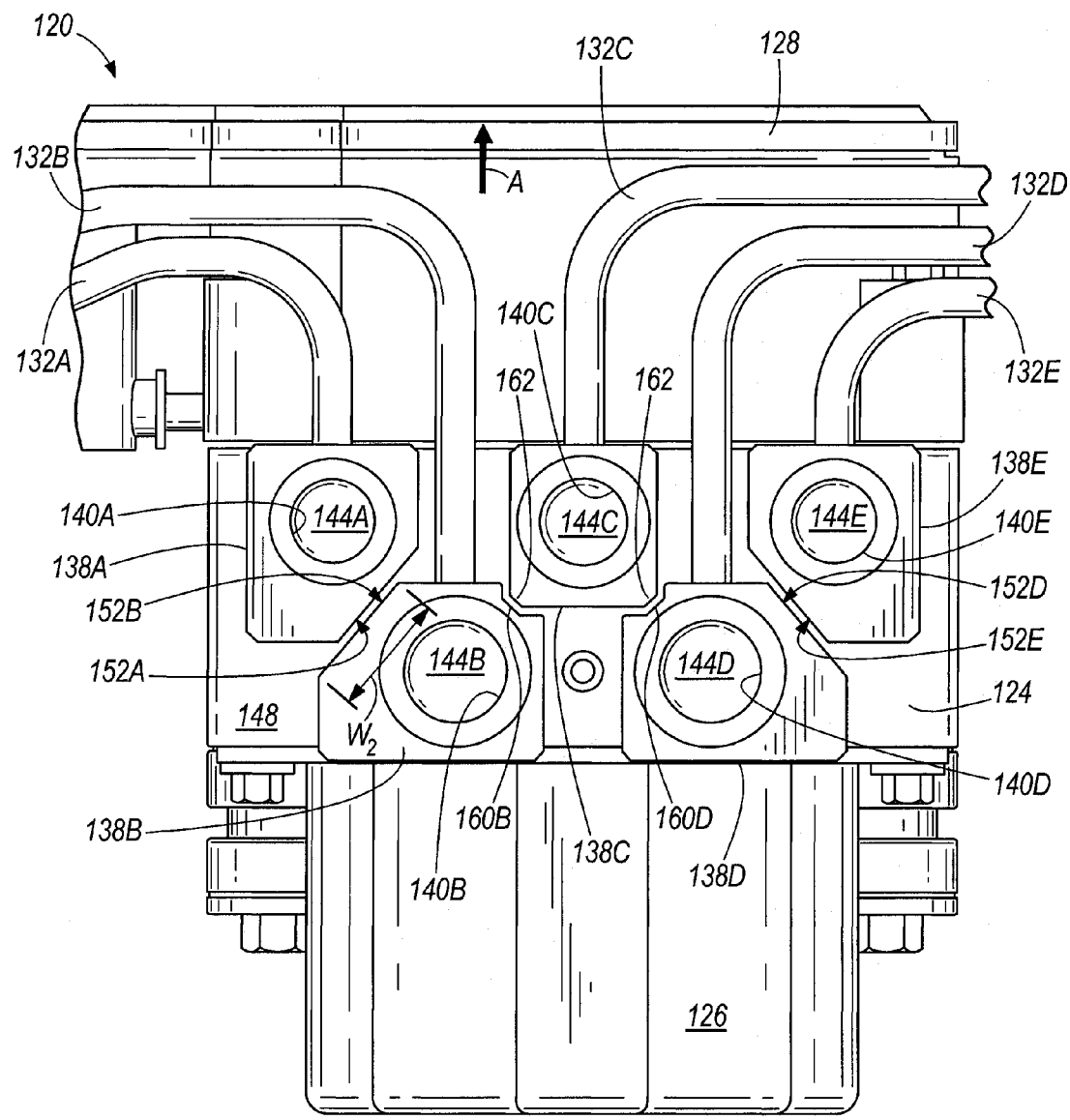
FIG. 5 is a top view of the ABS hydraulic unit of FIG. 4.

FIGS. 4 and 5 illustrate an anti-lock braking system hydraulic unit 120 of another construction. The ABS hydraulic unit 120 is substantially similar to the ABS hydraulic unit 20 of FIGS. 1-3, and the above description is referred to with respect to common features and operation. Therefore, the general use and operation of the ABS hydraulic unit 20, including the motor 126 and the controller 128, are not repeated. In contrast with the ABS hydraulic unit 20 of FIGS. 1-3, the ABS hydraulic unit 120 of FIGS. 4 and 5 includes a set of five hydraulic fittings ("banjo" fittings) for coupling five brake lines 132A-E to five corresponding fluid ports 144A-E provided in the surface 148 of the block 124. Although not shown in FIGS. 4 and 5, it will be understood that each banjo fitting includes a hollow bolt in addition to the banjo block 138A-E. The hollow bolts extend through the axial apertures or bores 140A-E and engage the respective ports 144A-E to establish fluid communication therewith and also mechanically fasten the respective banjo blocks 138A-E against the surface 148 of the block 124. A fluid path is then established between the fluid port 144A-E and the corresponding brake line 132A-E through the banjo fitting, as each brake line 132A-E is coupled with a transverse port 156A-E that is formed in the banjo block 138A-E to intersect with the corresponding bolt-receiving bore 140A-E. Although the set of banjo blocks 138A-E of FIGS. 4 and 5 are configured differently from those of FIGS. 1-3, they are designed to accomplish a similar goal of preventing a person assembling the ABS hydraulic unit 120 from coupling any brake lines 132A-E to incorrect ports 144A-E on the block 124, since each brake line 132A-E (and the remote devices coupled to the ABS hydraulic unit 120 thereby) has a prescribed port 144A-E which is intended to be utilized for proper operation of the braking system.

The banjo blocks 138A-E are arranged in a staggered row when positioned in register with the fluid ports 144A-E. The two banjo blocks 138A, 138E at the respective ends of the row are configured to cooperate with the next closest banjo blocks 138B, 138D similar to the adjacent pairs of banjo blocks of FIGS. 1-3. The inner three banjo blocks 138B-D are each configured to cooperate with two adjacent banjo blocks, one on a first side and another on a second side. As described below, the end pairs of banjo blocks (138A with 138B and 138D with 138E) are provided with complementary skewed sidewall surfaces 152A, 152B, 152D, 152E. The pairs of skewed sidewall surfaces 152A, 152B, 152D, 152E, which are formed as corner truncations of otherwise rectangular prism-shaped blocks, are configured to abut or to have a nominal clearance therebetween (e.g., 10 percent or less of the overlapping width $W_2$ of the surfaces 152A, 152B, 152D, 152E when viewed normal to the block surface 148 as shown in FIG. 5) when the banjo blocks 132A, 132B, 132D, 132E are positioned at their respective fluid ports 144A, 144B, 144D, 144E. Although the end pairs of banjo blocks are formed with complementary skewed surfaces 152A, 152B, 152D, 152E, the exterior shapes of each adjacent pair of banjo blocks are unique and control the relative orientation therebetween when coupled to the fluid ports 144A, 144B, 144D, 144E, and the incorrect assembly of a first banjo block of the adjacent pair prevents the subsequent incorrect assembly of a second banjo block of the adjacent pair due to a physical interference when attempting to place both banjo blocks against the surface 148 of the block 124 in register with improper fluid ports.

Each of the interior banjo blocks 138B, 138D that interface with the outer end banjo blocks 138A, 138E is also configured to cooperate with a central banjo block 138C in the illustrated construction. The central banjo block 138C is shaped generally as a rectangular prism. The banjo blocks 138B, 138D adjacent the central banjo block 138C are provided with notches 160B, 160D that are configured to receive corresponding corners 162 of the central banjo block 138C when these three banjo blocks 138B-D are positioned at their prescribed fluid ports 144B-D. The notches 160B, 160D and corners 162 are provided with abutting surfaces or a nominal clearance therebetween such that the relative orientation between the respective banjo blocks 138B-D is controlled. Misassembling one of the three interior banjo blocks 138B-D will prevent the misassembly of the adjacent banjo blocks by creating a physical interference that prevents multiple adjacent banjo blocks from being positioned against the surface 148 of the block 124 in register with improper fluid ports. In addition to the various skewed sidewall surfaces 152A, 152B, 152D, 152E and inter-fitting notches 160B, 160D and corners 162, four of the banjo blocks 138A, 138B, 138D, 138E are elongated to ensure interference upon misassembly. The two end banjo blocks 138A, 138E are elongated asymmetrically about the bolt-receiving bores 140A, 140E in a direction parallel to arrow A by providing substantially greater extension on one side of the bores 140A, 140E (in the direction opposite arrow A) than on the opposite side of the bores 140A, 140E (in the direction of arrow A). Likewise, the banjo blocks 138B, 138D immediately adjacent the end banjo blocks 138A, 138E are elongated in a direction perpendicular to arrow A by providing substantially greater extension on one side of the axial bores 140B, 140D than on the opposite side. The set of banjo blocks 138A-E have exterior shapes that fit together in only one prescribed manner when all of the banjo blocks 138A-E are positioned in register with the plurality of fluid ports 144A-E so that the only way to assemble the entire set of banjo fittings to the block 124 is when all of the banjo blocks 138A-E are paired with their prescribed fluid ports 144A-E. Thus, the banjo blocks 138A-E themselves cooperate with each other to provide an inherent poka-yoke (i.e., a mechanism that actively prevents an operator from making a mistake in a process) for the assembly of the banjo fittings to the prescribed fluid ports 144A-E.

It should be noted that, although all five brake lines 132A-E are routed from the banjo blocks 138A-E in a single direction (arrow A), various routings of the brake lines 132A-D may be provided, as desired by the manufacturer. Furthermore, more or less than five cooperating banjo blocks may be provided on the block 124 of the ABS unit 120, and if an even number of banjo blocks are provided, none are required to cooperate with multiple adjacent banjo blocks. Also, various combinations of complementary features and shapes may be provided between adjacent banjo blocks to establish orientation control and guarantee correct coupling of all the banjo blocks 138A-E with the prescribed fluid ports 144A-E.

Figure 6:
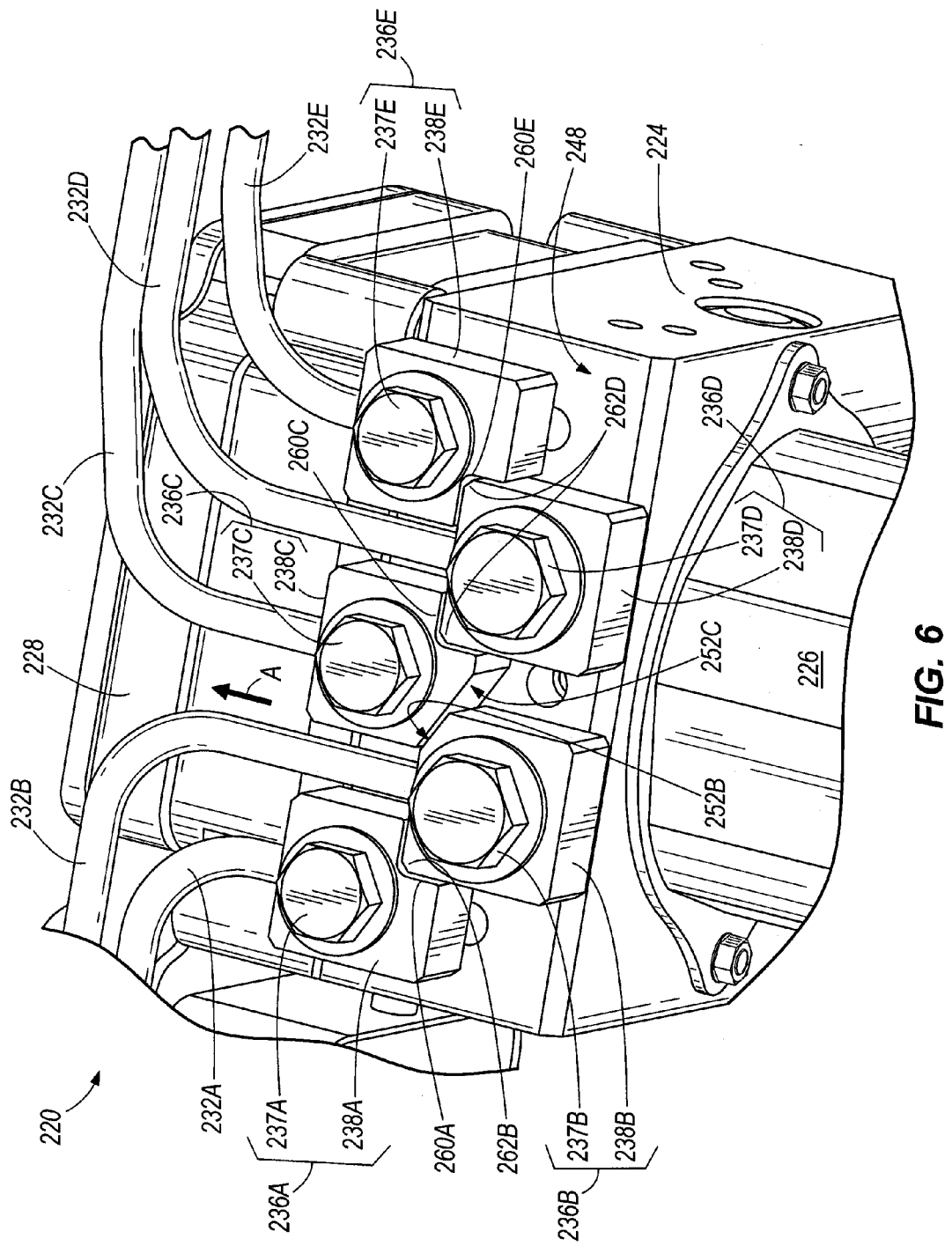
FIG. 6 is a perspective view of another ABS hydraulic unit, and a plurality of brake lines coupled to the ABS hydraulic unit via a set of banjo fittings of a third construction.
Figure 7:
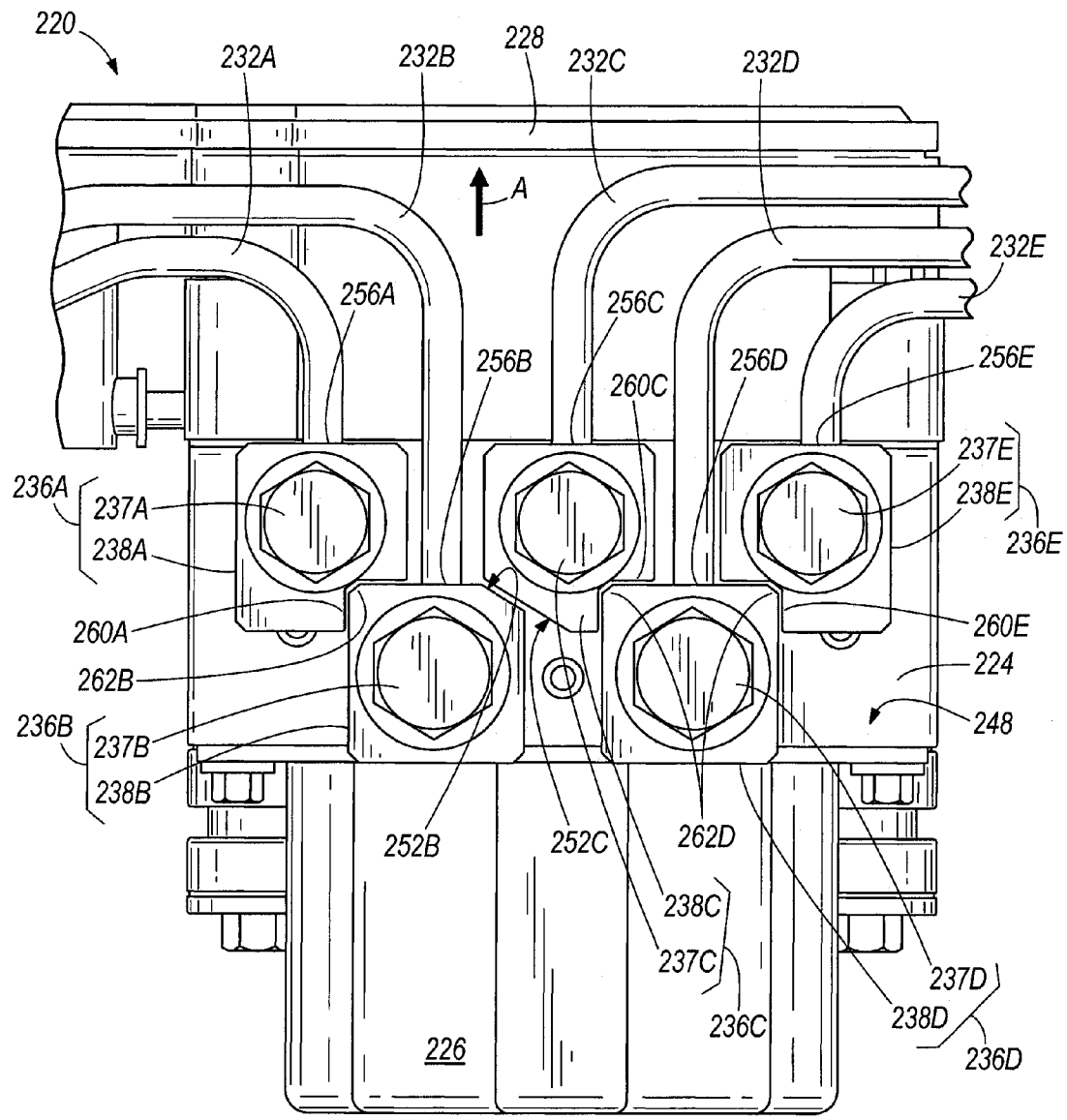
FIG. 7 is a top view of the ABS hydraulic unit of FIG. 6.

FIGS. 6 and 7 illustrate an anti-lock braking system hydraulic unit 220 of another construction. The ABS hydraulic unit 220 is substantially similar to the ABS hydraulic units 20, 220 of FIGS. 1-3 and FIGS. 4-5, and the above description is referred to with respect to common features and operation. Therefore, the general use and operation of the ABS hydraulic unit 220, including the motor 226 and the controller 228, are not repeated. Like the ABS hydraulic unit 120 of FIGS. 4-5, the ABS hydraulic unit 220 of FIGS. 6 and 7 includes a set of five hydraulic fittings ("banjo" fittings) 236A-E for coupling five brake lines 232A-E to five corresponding fluid ports provided in the surface 248 of the block 224. Each of the banjo fittings 236A-E includes a hollow bolt 237A-E and a banjo block 238A-E. The hollow bolts 237A-E extend through the axial apertures or bores (not shown) of the banjo blocks 238A-E and engage the respective fluid ports of the block 224 to establish fluid communication therewith and also mechanically fasten the respective banjo blocks 238A-E against the surface 248 of the block 224. A fluid path is then established between the fluid port and the corresponding brake line 232A-E through the banjo fitting 236A-E, as each brake line 232A-E is coupled with a transverse port 256A-E that is formed in the banjo block 238A-E to intersect with the corresponding bolt-receiving bore. Although the set of banjo blocks 238A-E of FIGS. 6 and 7 are configured differently from those of FIGS. 1-3 and FIGS. 4-5, they are designed to accomplish a similar goal of preventing a person assembling the ABS hydraulic unit 220 from coupling any brake lines 232A-E to incorrect fluid ports on the block 224, since each brake line 232A-E (and the remote devices coupled to the ABS hydraulic unit 220 thereby) has a prescribed port which is intended to be utilized for proper operation of the braking system.

The banjo blocks 238A-E are arranged in a staggered row when positioned in register with the fluid ports of the block 224. The two banjo blocks 238A, 238E at the respective ends of the row are provided with notches 260A, 260E configured to cooperate with the next closest banjo blocks 238B, 238D by receiving adjacent corners 262B, 262D thereof. Each corresponding set of notches 260A, 260E and corners 262B, 262D are configured to have their surfaces abutting or nominally spaced apart (e.g., 10 percent or less of the overlapping perimeter length of each paired notch and corner as viewed normal to the block surface 248) to control the relative orientation therebetween when coupled to the respective fluid ports. The unique shapes of these adjacent pairs of banjo blocks also present a physical interference when attempting to place two adjacent banjo blocks against the surface 248 of the block 224 in register with improper fluid ports when one of the banjo blocks is coupled to an incorrect fluid port. The central banjo block 238C is provided with multiple different types of features configured to cooperate with the two adjacent banjo blocks 238B, 238D. The central banjo block 238C cooperates with the adjacent banjo block 238B on a first side via complementary skewed sidewall surfaces 252B, 252C. The pairs of skewed sidewall surfaces 252B, 252C, which are formed as corner truncations of otherwise rectangular prism-shaped blocks 238B, 238C, are configured to abut or to have a nominal clearance therebetween (e.g., 10 percent or less of the overlapping width of the surfaces 252B, 252C as viewed normal to the block surface 248) when the banjo blocks 238B, 238C are positioned at their respective fluid ports. In addition to the skewed sidewall surface 252C, the central banjo block 238C includes a notch 260C configured to receive a corner 262D of the second adjacent banjo block 238D. The interfitting surfaces of the notch 260C and the corner 262D are either configured to abut or to have a nominal clearance therebetween (e.g., 10 percent or less of the overlapping perimeter length of the notch 260C and the corner 262D as viewed normal to the block surface 248). The complementary exterior shapes of each unique adjacent pair of banjo blocks 238A-E control the relative orientation therebetween when coupled to the fluid ports, and the incorrect assembly of a first banjo block of each adjacent pair prevents the subsequent incorrect assembly of a second banjo block of the pair due to a physical interference when attempting to place both banjo blocks against the surface 248 of the block 224 in register with improper fluid ports.

In addition to the various skewed sidewall surfaces 252B, 252C and inter-fitting notches 260A, 260C, 260E and corners 262B, 262D, every other one of the banjo blocks (e.g., the two end banjo blocks 238A, 238E and the central banjo block 238C) are elongated to ensure interference upon misassembly. All three elongated banjo blocks 238A, 238C, 238E are elongated asymmetrically about the axis of the respective bolts 237A, 237C, 237E and bolt-receiving bores in a direction parallel to arrow A by providing substantially greater extension on one side of the bolt-receiving bores (in the direction opposite arrow A) than on the opposite side of the bolt-receiving bores (in the direction of arrow A). The set of banjo blocks 238A-E have exterior shapes that fit together in only one prescribed manner when all of the banjo blocks 238A-E are positioned in register with the plurality of fluid ports so that the only way to assemble the entire set of fittings 236A-E to the block 224 is when all of the banjo blocks 238A-E are paired with their prescribed fluid ports. Thus, the banjo blocks 238A-E themselves cooperate with each other to provide an inherent poka-yoke (i.e., a mechanism that actively prevents an operator from making a mistake in a process) for the assembly of the banjo fittings 236A-E to the prescribed fluid ports.

It should be noted that, although all five brake lines 232A-E are routed from the banjo blocks 238A-E in a single direction (arrow A), various routings of the brake lines 232A-D may be provided, as desired by the manufacturer. Furthermore, more or less than five cooperating banjo blocks may be provided on the block 224 of the ABS unit 220, and if an even number of banjo blocks are provided, none are required to cooperate with multiple adjacent banjo blocks. Also, various combinations of complementary features and shapes may be provided between adjacent banjo blocks to establish orientation control and guarantee correct coupling of all the banjo blocks 238A-E with the prescribed fluid ports.

Figure 8:
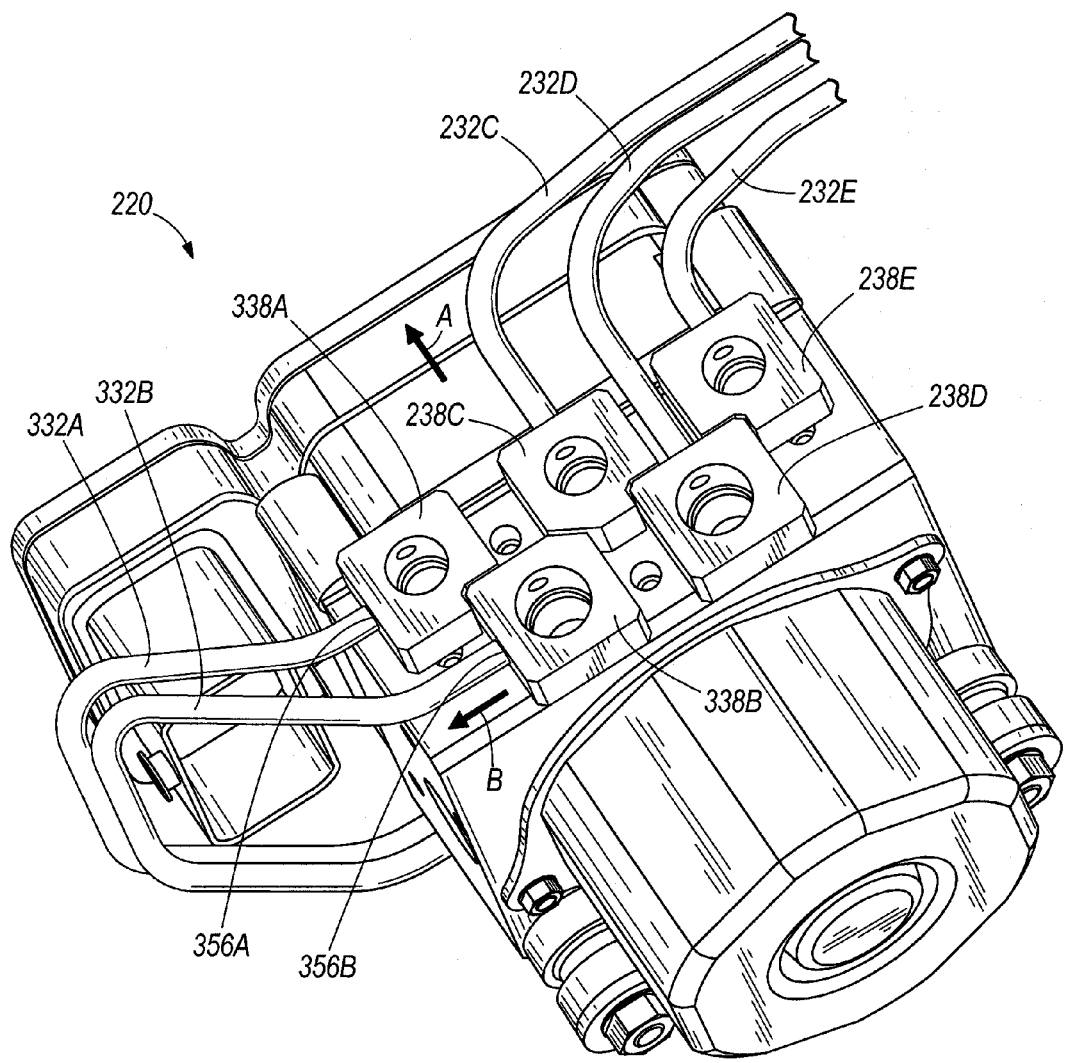
FIG. 8 is a perspective view of an ABS hydraulic unit having a similar set of banjo fittings as those of FIGS. 6 and 7, but accommodating an alternate configuration of brake lines.
Figure 9:
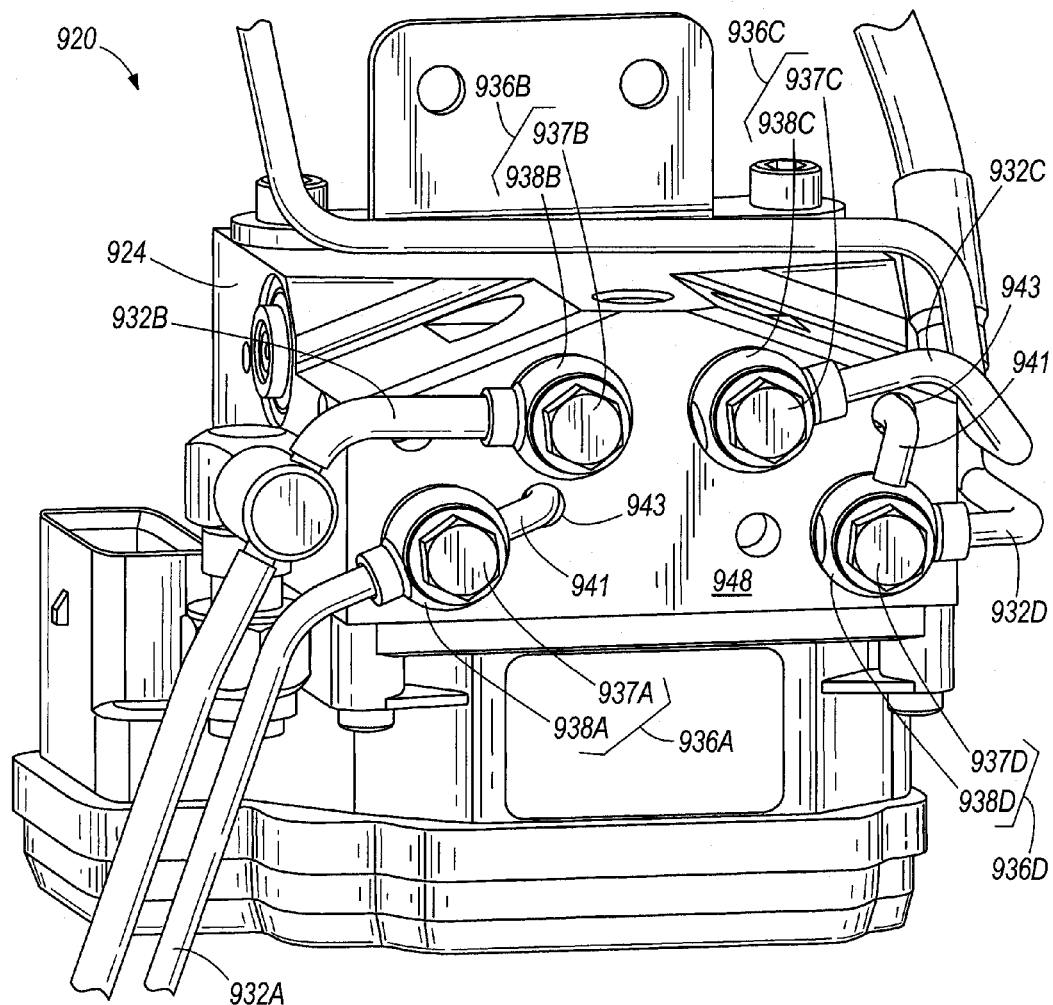
FIG. 9 is a perspective view of a prior art ABS hydraulic unit, and a plurality of brake lines coupled to the ABS hydraulic unit via a set of banjo fittings, some of which utilize positioning fingers as an assembly aid.

FIG. 8 illustrates the ABS hydraulic unit 220 of FIGS. 6 and 7, with a modified set of banjo blocks. Two modified banjo blocks 338A, 338B are provided in place of the original banjo blocks 238A, 238B (an adjacent end pair). The remaining banjo blocks 238C-E are identical to those shown in FIGS. 6 and 7. Of the modified and non-modified banjo blocks, the cooperating complementary exterior features of each adjacent pair of banjo blocks is the same as that described above and illustrated in FIGS. 6 and 7. The only difference between the modified banjo blocks 338A, 338B and the corresponding banjo blocks 238A, 238B of FIGS. 6 and 7 is that the modified banjo blocks 338A, 338B of FIG. 8 are provided with transverse bores 356A, 356B that are oriented at a 90 degree angle from those shown in FIGS. 6 and 7.

Thus, the brake lines 332A, 332B that mate with the modified banjo blocks 338A, 338B extend in a direction indicated by arrow B that is angled 90 degrees from the remaining brake lines 232C-D, which are parallel with arrow A. Although the configuration of FIGS. 6 and 7 is equally adept at preventing misassembly, having multiple differing orientations of the brake lines extending from various banjo blocks within one set further adds to the uniqueness of each banjo block, and may enhance the ease with which the person assembling the ABS hydraulic unit 220 can identify the correct positions of all of the banjo blocks. The configuration of FIG. 8 is presented as a non-limiting example of perpendicular brake line orientations, which will be understood by one of ordinary skill in the art to be applicable in various ways to any of the disclosed embodiments, or combinations and re-configurations thereof.

It should be evident that the shapes of the various banjo blocks of each set of banjo fittings described above not only act as a poka-yoke to prevent misassembly with non-prescribed fluid ports, but also visually instruct the person assembling the fittings with the block on proper assembly since the shapes of the various banjo blocks convey the appearance of properly-arranged mating or interconnecting adjacent pieces of a jigsaw puzzle when assembled properly with the prescribed fluid ports. This is particularly true of the constructions shown in FIGS. 4-8, in which every adjacent pair of banjo blocks mate together, and male-female interfaces are provided.

Not all aspects of the invention are limited to ABS hydraulic units and brake lines. Other types of hydraulic manifold assemblies with multi-port manifold blocks will benefit from aspects of the invention wherever the assembly of hydraulic devices, lines, and/or fittings to specific fluid ports on the manifold block is critical.

Various features and advantages of the invention are set forth in the following claims.

What is claimed is:

1. A hydraulic manifold assembly comprising:
    a block including a plurality of fluid ports provided on a common surface of the block; and
    a set of hydraulic fittings, each fitting of the set being assigned to a prescribed one of the plurality of fluid ports of the block, each fitting of the set including a hollow bolt insertable into the prescribed fluid port, and a banjo block having a first aperture for receiving the hollow bolt and a second aperture intersecting the first aperture, the second aperture providing an external fluid port for fluidly coupling a remote device to the prescribed one of the plurality of fluid ports of the block;
    wherein the plurality of banjo blocks includes at least one adjacent pair of banjo blocks that are unique from each other and have exterior shapes that are complementary to each other to control the relative orientation therebetween when coupled to the prescribed fluid ports and that cooperate to interfere with each other to prevent the assembly of a first banjo block of the at least one adjacent pair with the prescribed fluid port of a second banjo block of the at least one adjacent pair when the second banjo block is coupled with the prescribed fluid port of the first banjo block.

2. The hydraulic manifold assembly of claim 1, wherein the complementary exterior shapes of the at least one adjacent pair of banjo blocks include complementary skewed sidewall surfaces.

3. The hydraulic manifold assembly of claim 1, wherein the complementary exterior shapes of the at least one adjacent pair of banjo blocks provide a male-female interface.

4. The hydraulic manifold assembly of claim 3, wherein the complementary exterior shapes of the at least one adjacent pair of banjo blocks include a notch in one of the first and second banjo blocks shaped to receive a corner of the other of the first and second banjo blocks.

5. The hydraulic manifold assembly of claim 1, wherein the at least one adjacent pair of banjo blocks includes a first pair provided by the first and second banjo blocks and a second pair provided by the second banjo block and a third banjo block, the second banjo block being shared between the first pair and the second pair by cooperating with both the first and third banjo blocks.

6. The hydraulic manifold assembly of claim 5, wherein the second banjo block cooperates with the first banjo block via complementary skewed sidewall surfaces, and cooperates with the second banjo block via a notch in one of the second and third banjo blocks shaped to receive a corner of the other of the second and third banjo blocks.

7. The hydraulic manifold assembly of claim 1, wherein the external fluid ports of all of the plurality of banjo blocks face in one direction when the set of hydraulic fittings are coupled to their prescribed fluid ports.

8. The hydraulic manifold assembly of claim 1, wherein, when the set of hydraulic fittings are coupled to the prescribed fluid ports, the external fluid port of at least one of the plurality of banjo blocks faces in first direction and the external fluid port of at least another of the plurality of banjo blocks faces in a second direction that is one of opposite to and orthogonal to the first direction.

9. The hydraulic manifold assembly of claim 1, wherein the plurality of fluid ports are provided in a non-linear spatial array on the common surface of the block.

10. The hydraulic manifold assembly of claim 1, wherein at least one of the plurality of banjo blocks is elongated asymmetrically about the first aperture therein.

11. A hydraulic manifold assembly comprising:
a block including a plurality of fluid ports provided on a common surface of the block; and
a set of hydraulic fittings, each fitting of the set being assigned to a prescribed one of the plurality of fluid ports of the block, each fitting of the set including a hollow bolt insertable into the prescribed fluid port, and a banjo block having a first aperture for receiving the hollow bolt and a second aperture intersecting the first aperture, the second aperture providing an external fluid port for fluidly coupling a remote device to the prescribed one of the plurality of fluid ports of the block,
wherein each one of the plurality of banjo blocks has an exterior shape that complements the exterior shape of at least one adjacent banjo block to allow the banjo block to lie side-by-side with the at least one adjacent banjo block against the common surface when the banjo block and the at least one adjacent banjo block are positioned in register with the prescribed fluid ports, and that interferes with the exterior shape of the at least one adjacent banjo block to prevent the banjo block from lying side-by-side with the at least one adjacent banjo block against the common surface when at least one of the banjo block and the at least one adjacent banjo block is positioned in register with a non-prescribed fluid port.

12. The hydraulic manifold assembly of claim 11, wherein the exterior shapes of at least one adjacent pair of banjo blocks include complementary skewed sidewall surfaces.

13. The hydraulic manifold assembly of claim 11, wherein the exterior shapes of at least one adjacent pair of banjo blocks include complementary male and female portions.

14. The hydraulic manifold assembly of claim 13, wherein the exterior shapes of the at least one adjacent pair of banjo blocks include a notch in one of the banjo blocks shaped to receive a corner of another of the banjo blocks.

15. The hydraulic manifold assembly of claim 11, wherein the plurality of banjo blocks include a first adjacent pair provided by first and second banjo blocks and a second adjacent pair provided by the second banjo block and a third banjo block, the second banjo block being shared between the first adjacent pair and the second adjacent pair by cooperating with both the first and third banjo blocks.

16. The hydraulic manifold assembly of claim 15, wherein the second banjo block cooperates with the first banjo block via complementary skewed sidewall surfaces, and cooperates with the second banjo block via a notch in one of the second and third banjo blocks shaped to receive a corner of the other of the second and third banjo blocks.

17. The hydraulic manifold assembly of claim 11, wherein the external fluid ports of all of the plurality of banjo blocks face in one direction when the set of hydraulic fittings are coupled to their prescribed fluid ports.

18. The hydraulic manifold assembly of claim 11, wherein, when the set of hydraulic fittings are coupled to the prescribed fluid ports, the external fluid port of at least one of the plurality of banjo blocks faces in first direction and the external fluid port of at least another of the plurality of banjo blocks faces in a second direction that is one of opposite to and orthogonal to the first direction.

19. The hydraulic manifold assembly of claim 11, wherein the plurality of fluid ports are provided in a non-linear spatial array on the common surface of the block.

20. The hydraulic manifold assembly of claim 11, wherein at least one of the plurality of banjo blocks is elongated asymmetrically about the first aperture therein.

21. The hydraulic manifold assembly of claim 11, wherein the complementary exterior shapes of each banjo block and at least one adjacent banjo block inhibit rotation of the banjo block and the at least one adjacent banjo block when coupled to the prescribed fluid ports.

22. A hydraulic manifold assembly comprising:
a block including a plurality of fluid ports provided on a common surface of the block; and
a set of hydraulic fittings, each fitting of the set being assigned to a prescribed one of the plurality of fluid ports of the block, each fitting of the set including a hollow bolt insertable into the prescribed fluid port, and a banjo block having a first aperture for receiving the hollow bolt and a second aperture intersecting the first aperture, the second aperture providing an external fluid port for fluidly coupling a remote device to the prescribed one of the plurality of fluid ports of the block,
wherein the plurality of banjo blocks have exterior shapes that fit together in only one prescribed manner when all of the banjo blocks are positioned in register with the plurality of fluid ports so that the only way to assemble the entire set of hydraulic fittings to the block is when all of the hydraulic fittings are paired with their prescribed fluid ports.

23. A method of assembling a hydraulic manifold assembly including a block including a plurality of fluid ports provided on a common surface of the block, and a set of hydraulic fittings, each fitting of the set being assigned to a prescribed one of the plurality of fluid ports of the block, each fitting of the set including a hollow bolt insertable into the corresponding fluid port, and a banjo block having a first aperture for receiving the hollow bolt and a second aperture intersecting the first aperture, the second aperture providing an external fluid port for fluidly coupling a remote device to the prescribed one of the plurality of fluid ports of the block, the method comprising:

coupling at least one adjacent pair of unique banjo blocks of the plurality of banjo blocks to the prescribed fluid ports such that the exterior shapes of the adjacent pair are complementary to each other to control the relative orientation therebetween, wherein the exterior shapes would otherwise cooperate to interfere with each other to prevent the assembly of a first banjo block of the at least one adjacent pair with the prescribed fluid port of a second banjo block of the at least one adjacent pair when the second banjo block is coupled with the prescribed fluid port of the first banjo block.

* * * * *